(12) United States Patent
Suzui

(10) Patent No.: US 9,958,633 B2
(45) Date of Patent: May 1, 2018

(54) DRIVE CONTROL APPARATUS, AND LENS APPARATUS AND IMAGE PICKUP SYSTEM INCLUDING THE DRIVE CONTROL APPARATUS

(71) Applicant: CANON KABUSHIKI KAISHA, Tokyo (JP)

(72) Inventor: Masaki Suzui, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/184,174

(22) Filed: Jun. 16, 2016

(65) Prior Publication Data

US 2016/0377829 A1 Dec. 29, 2016

(30) Foreign Application Priority Data

Jun. 25, 2015 (JP) ................. 2015-127952

(51) Int. Cl.
*G02B 7/04* (2006.01)
*G02B 27/00* (2006.01)
*F16H 57/12* (2006.01)

(52) U.S. Cl.
CPC ............. *G02B 7/04* (2013.01); *F16H 57/12* (2013.01); *G02B 27/0068* (2013.01); *F16H 2057/123* (2013.01)

(58) Field of Classification Search
CPC ....... G02B 7/04; G02B 27/0068; F16H 57/12; F16H 2057/123
USPC ........................................................ 348/357
See application file for complete search history.

(56) References Cited

U.S. PATENT DOCUMENTS

| | | | | |
|---|---|---|---|---|
| 6,760,066 | B1 * | 7/2004 | Kawamura | G02B 7/102 348/240.3 |
| 7,955,006 | B1 * | 6/2011 | Harvey | F16M 11/10 396/12 |
| 8,214,083 | B2 * | 7/2012 | Kawai | A61B 1/00147 600/118 |
| 9,447,849 | B1 * | 9/2016 | Edsinger | B25J 9/1045 |
| 9,505,132 | B1 * | 11/2016 | Bingham | B25J 9/1671 |
| 2002/0118965 | A1 * | 8/2002 | Ogg | G02B 7/04 396/79 |

(Continued)

FOREIGN PATENT DOCUMENTS

JP 2005323488 A 11/2005

*Primary Examiner* — Pritham Prabhakher
(74) *Attorney, Agent, or Firm* — Rossi, Kimms & McDowell LLP

(57) ABSTRACT

A drive control apparatus includes a movable member; a driver configured to drive the movable member; a transmission device configured to transmit a driving force of the driver to the movable member; a first detector provided on the movable member side of the transmission device configured to detect a driving state of the movable member; a second detector provided on the driver side of the transmission device configured to detect a driving state of the driver; and a controller configured to control driving of the driver. The controller is configured to select, as information to be fed back, first drive information obtained from the first detector, or second drive information obtained from the second detector, based on the first drive information and the second drive information; and control the driving of the driver based on the selected one of the first drive information and the second drive information.

12 Claims, 15 Drawing Sheets

(56) References Cited

U.S. PATENT DOCUMENTS

| | | | |
|---|---|---|---|
| 2008/0262306 A1* | 10/2008 | Kawai | A61B 1/00039 600/118 |
| 2009/0025298 A1* | 1/2009 | Hawkins | E06B 9/68 49/358 |
| 2009/0073388 A1* | 3/2009 | Dumm | F16M 11/10 352/243 |
| 2009/0102402 A1* | 4/2009 | Jiang | H02P 5/747 318/48 |
| 2009/0167231 A1* | 7/2009 | Sussmeier | H02P 5/695 318/610 |
| 2011/0009698 A1* | 1/2011 | Ashida | A61B 1/00006 600/118 |
| 2011/0013051 A1* | 1/2011 | Suzui | G03B 17/14 348/241 |
| 2011/0015786 A1* | 1/2011 | Kawai | A61B 1/00147 700/256 |
| 2011/0065994 A1* | 3/2011 | Kudoh | A61B 1/0051 600/146 |
| 2011/0283902 A1* | 11/2011 | Lugaresi | B41J 3/4071 101/35 |
| 2012/0089254 A1* | 4/2012 | Shafer | B25J 13/088 700/258 |
| 2013/0025391 A1* | 1/2013 | Magnusson | B41J 11/42 74/409 |
| 2013/0148212 A1* | 6/2013 | Okawa | G02B 15/14 359/691 |
| 2015/0321348 A1* | 11/2015 | Rollinson | B25J 9/065 700/253 |
| 2016/0049025 A1* | 2/2016 | Johnson | G07C 9/00007 340/5.61 |

* cited by examiner

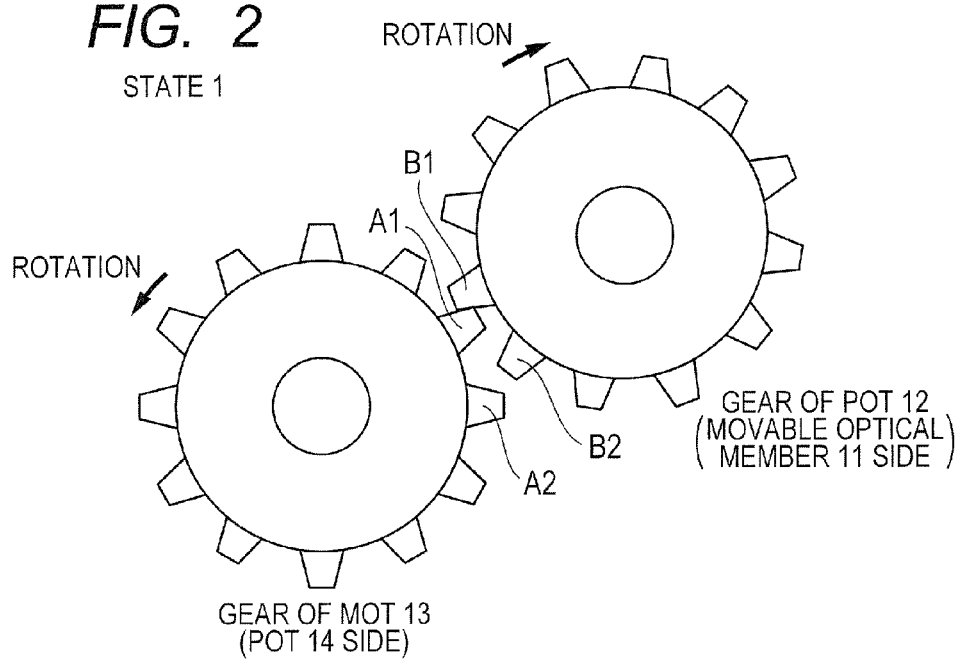
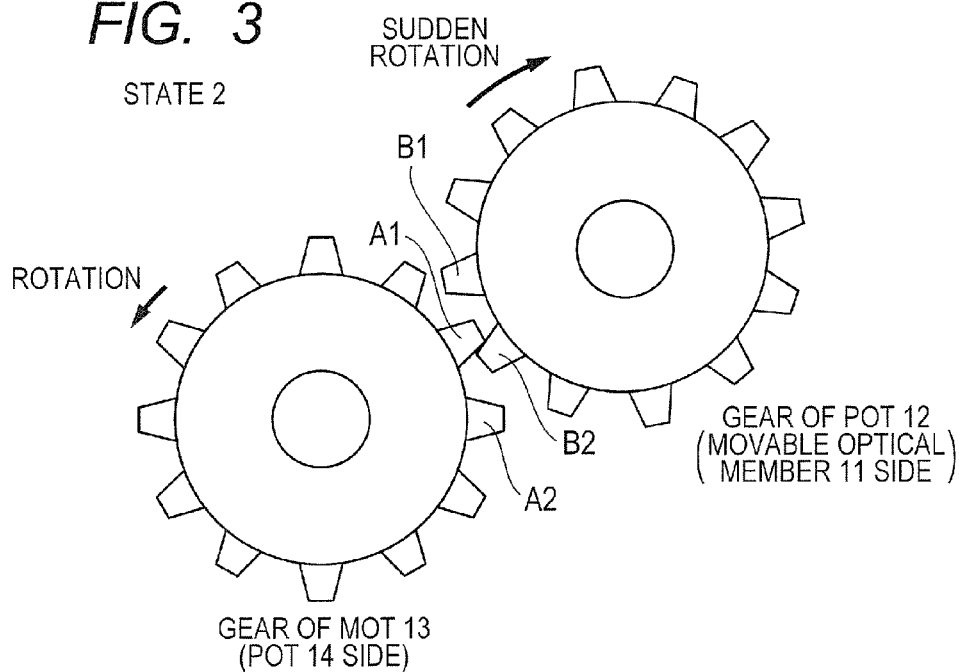

STATE 3 → STATE 4
STOP → START ROTATING

STATE 4

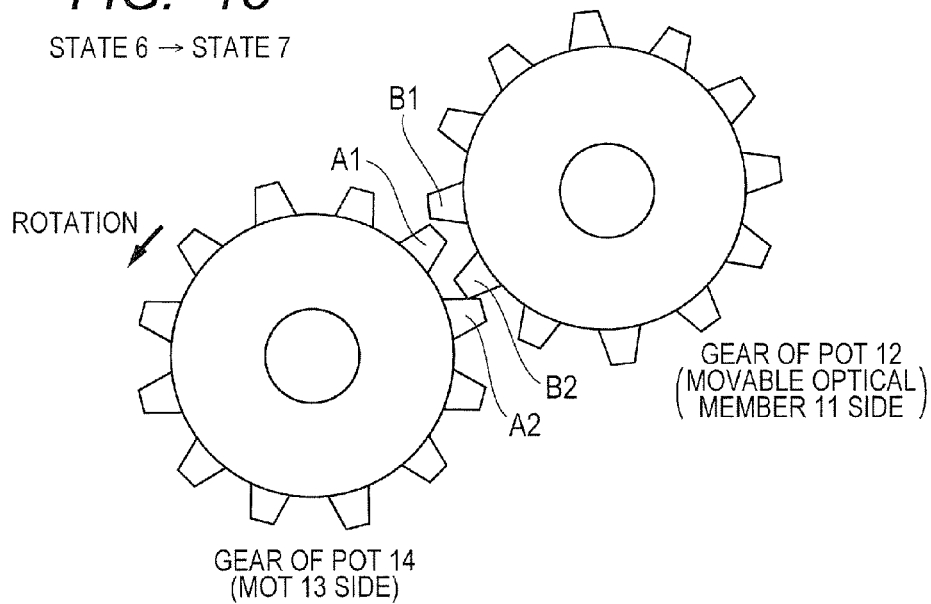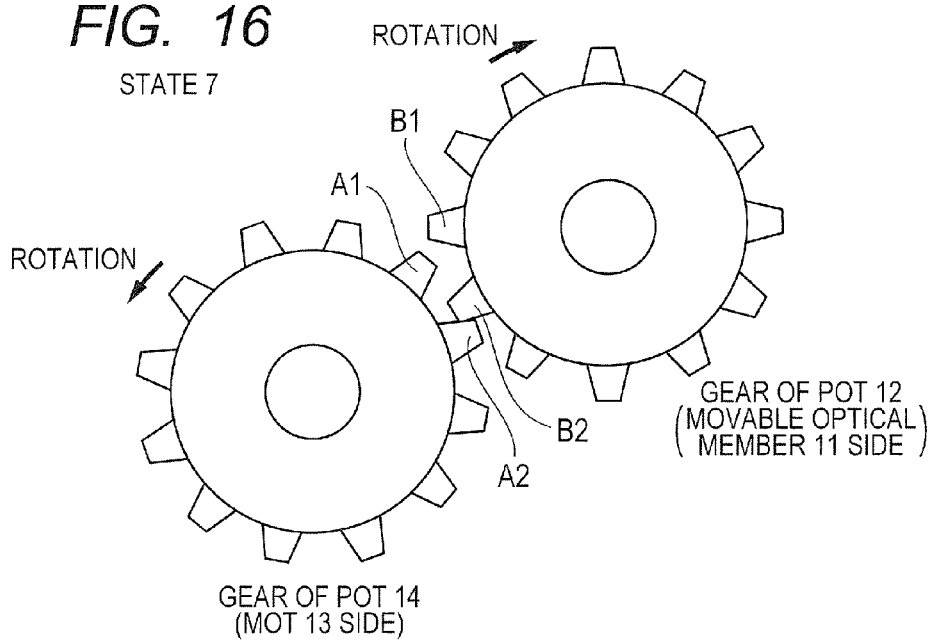

DRIVE CONTROL APPARATUS, AND LENS APPARATUS AND IMAGE PICKUP SYSTEM INCLUDING THE DRIVE CONTROL APPARATUS

BACKGROUND OF THE INVENTION

Field of the Invention

The present invention relates to a drive control apparatus configured to control the driving of a movable member, and more particularly, to a lens apparatus and an image pickup system that include a drive control apparatus configured to control the driving of a movable optical member.

Description of the Related Art

Lens apparatus in which a movable optical member driven by a motor is controlled have employed feedback control to reduce to zero a difference between a control target and the position of the movable optical member, which is detected by a position detector. An example thereof is disclosed in Japanese Patent Application Laid-Open No. 2005-323488.

When a drive transmission mechanism configured to transmit a driving force from the motor to the position detector is, for example, a gear train in the technology of Japanese Patent Application Laid-Open No. 2005-323488, play (clearance, e.g., backlash) between gears of the gear train causes a difference between the driving position of the motor, which is a control target, and the result of position detection by the position detector, and a phase inversion of a control output and the position detection result due to the difference may lead to oscillation phenomena.

The oscillation phenomena are brought about especially when the movable optical member moves under the influence of an external force, e.g., gravity, thereby causing the detected position of the driven member to change (forward with respect to the direction of driving) within the extent of play irrespective of the motor's driving.

SUMMARY OF THE INVENTION

The present invention provides a drive control apparatus capable of drive control that prevents a change in the detected position of a movable optical member under the influence of an external force unrelated to a motor's driving from leading to oscillation phenomena.

According to one embodiment of the present invention, there is provided a drive control apparatus, including: a movable member; a driver configured to drive the movable member; a transmission device configured to transmit a driving force of the driver to the movable member; a first detector provided on a movable member side of the transmission device and configured to detect a driving state of the movable member; a second detector provided on a driver side of the transmission device and configured to detect a driving state of the driver; and a controller configured to control driving of the driver, in which the controller is configured to: select, as information to be fed back, one of first drive information which is obtained from the first detector, and second drive information which is obtained from the second detector, based on the first drive information and the second drive information; select the second drive information as the information to be fed back when the first drive information precedes the second drive information in a driving direction of the controlled driver; and control the driving of the driver based on the selected one of the first drive information and the second drive information.

According to the lens apparatus of the present invention, it is possible to provide the drive control apparatus capable of drive control that prevents a change in the detected position of the movable optical member under the influence of an external force unrelated to the motor's driving from leading to oscillation phenomena.

Further features of the present invention will become apparent from the following description of exemplary embodiments with reference to the attached drawings.

BRIEF DESCRIPTION OF THE DRAWINGS

FIG. 2 is a diagram for illustrating an engaged state of gears in the first embodiment.

FIG. 3 is a diagram for illustrating an engaged state of the gears in the first embodiment.

FIG. 15 is a diagram for illustrating an engaged state of the gears in the second embodiment.

FIG. 16 is a diagram for illustrating an engaged state of the gears in the second embodiment.

DESCRIPTION OF THE EMBODIMENTS

Figure 1:
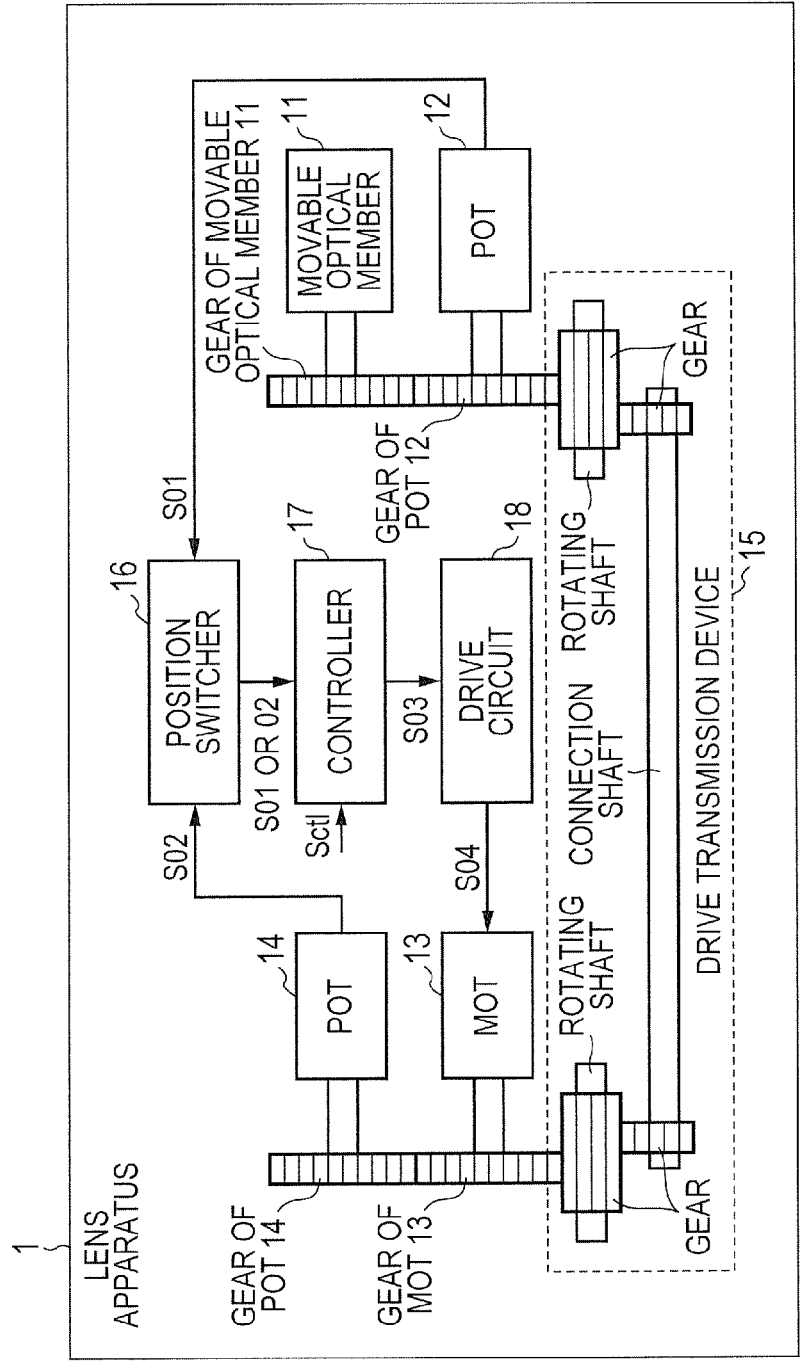
FIG. 1 is a function block diagram of a lens apparatus 1 that includes a drive control apparatus according to a first embodiment of the present invention.

The present invention is described in detail by way of embodiments illustrated in the drawings.

First Embodiment

A drive control apparatus according to a first embodiment of the present invention is described with reference to FIG. 1 to FIG. 10.

FIG. 1 is a function block diagram of a lens apparatus 1 that includes the drive control apparatus of this embodiment.

The lens apparatus 1 mainly includes a movable optical member 11, a potentiometer 12 (hereinafter also referred to as "POT 12") configured to detect the position of the movable optical member 11 and to output position information, a rotating motor 13 (hereinafter also referred to as "MOT 13") configured to drive the movable optical member 11, and a potentiometer 14 (hereinafter also referred to as "POT 14") configured to detect the rotation position of the MOT 13 and to output position information. The lens apparatus 1 further includes a drive transmission device 15 configured to transmit a driving force of the MOT 13 to the movable optical member 11, a position switcher 16 configured to switch from one of position information of the POT 12 and position information of the POT 14 to the other and to output the switched-to position information, a controller 17 configured to perform feedback control on the MOT 13 with the use of position information output by the position switcher 16, and a drive circuit 18 configured to drive the MOT 13.

To elaborate, the movable optical member 11 includes a lens unit having a well-known movable mechanism, which is mounted to the lens apparatus. The lens unit in this embodiment is a zoom lens unit for varying the power of the lens apparatus, and has a gear of the movable optical member 11 which is used to drive the movable mechanism. The gear of the movable optical member 11 is engaged with a gear of the POT 12. The POT 12 and the POT 14 are well-known potentiometers in which a gear is fixed to a rotating shaft.

The gear of the POT 12 is engaged with the gear of the movable optical member 11 and one of gears of the drive transmission device 15 to detect the rotation position of the movable optical member 11 and to output position information S01. The gear of the POT 14 is connected to a gear of the MOT 13 to detect the rotation position of the MOT 13 and to output position information S02. The MOT 13 is a well-known DC motor in which a gear is fixed to a rotating shaft, and the gear of the MOT 13 is engaged with the gear of the POT 14 and one of the gears of the drive transmission device 15.

The drive transmission device 15 includes a well-known gear train, a connection shaft, and other components. The drive transmission device 15 connects the gear of the POT 12 and the gear of the MOT 13 to transmit a driving force of the MOT 13 to the movable optical member 11 via the drive transmission device 15. The gear of the movable optical member 11 and the gear of the POT 14 may be connected directly to the gears of the drive transmission device 15. The POT 12 is placed on the movable optical member side (movable member side) of the drive transmission device 15 to detect the driving state of the movable member. The POT 14 is placed on the motor side (driver side) of the drive transmission device 15 to detect the driving state (position, speed, and the like) of the motor. The position information S01 and the position information S02 are input to the position switcher 16.

The position switcher 16 outputs one of the position information S01 and the position information S02 to the controller 17, which is described later, based on switching conditions, which are described later (with reference to FIG. 10). A control target position (control target value) Sct1 and position information that is output as a feedback signal by the position switcher 16 are input to the controller 17. The controller 17 outputs a control signal S03 with which feedback control is performed on the MOT 13 to the drive circuit 18, which is described later. The drive circuit 18 receives the control signal S03 input thereto, and outputs a drive signal S04 to drive the MOT 13.

The control target position Sct1 is a position information that indicates a control target of the MOT 13 (the movable optical member 11). The control signal S03 is an output signal of the controller 17 which is obtained by adjusting a difference between the control target position Sct1 and the position information with a gain or the like.

Mechanical driving mechanisms generally have various types of play, and also in this embodiment, there is a backlash or other types of play between gears. In this embodiment, the gear of the POT 12 and the gear of the movable optical member 11 are arranged next to each other, and the gear of the POT 14 and the gear of the MOT 13 are arranged next to each other. The amount of backlash between the POT 12 and the movable optical member 11 is smaller than the amount of backlash between the POT 14 and the movable optical member 11. The amount of backlash between the POT 14 and the MOT 13 is smaller than the amount of backlash between the POT 12 and the MOT 13.

The movement of the gear of the POT 12 and the gear of the MOT 13 in this embodiment is described next with reference to FIG. 2 to FIG. 9.

FIG. 2, FIG. 3, and FIG. 7 to FIG. 9 are schematic diagrams for illustrating an engaged state of the gear of the POT 12 and the gear of the MOT 13, which rotates counter-clockwise (to the left on the paper) and rotates clockwise (to the right on the paper), respectively. Gear teeth A2 and A1 of the MOT 13 are arranged in the counter-clockwise direction in the order stated. Gear teeth B2 and B1 of the POT 12 are arranged in the clockwise direction in the order stated. Gear of the drive transmission device 15 that are interposed between the gear of the POT 12 and the gear of the MOT 13 are omitted in the description given here for the sake of convenience.

FIG. 2 is a diagram for illustrating a normal state in which the gear of the MOT 13 is driving the gear of the POT 12 (the movable optical member side), and the gear tooth A1 of the MOT 13 and the gear tooth B1 of the POT 12 are engaged with each other (hereinafter referred to as "State 1").

FIG. 3 is a diagram for illustrating a state in which the gear of the POT 12 alone has suddenly rotated from State 1, with the result that the gear tooth A1 of the MOT 13 is engaged with the gear tooth B2 of the POT 12 (hereinafter referred to as "State 2"). This is a state in which the gear of the POT 12 (the movable optical member 11) has moved under the influence of, for example, an external force irrespective of the rotation of the MOT 13.

The operation in State 1 and State 2 and oscillation phenomena are described next with reference to FIG. 4 and FIG. 5.

Figure 4:
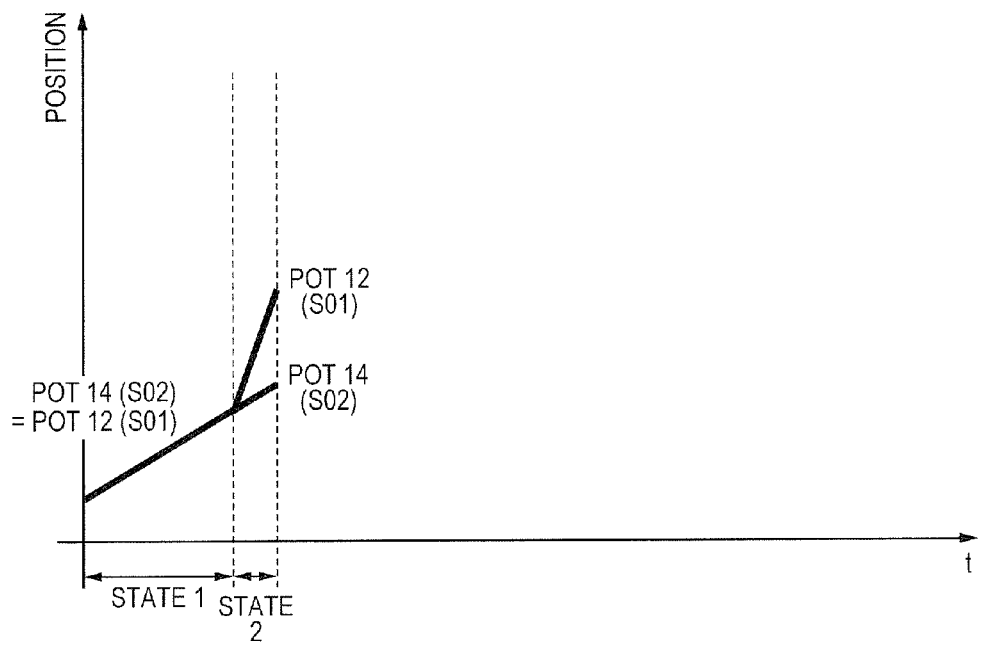
FIG. 4 is a graph for showing the rotation operation of the gears in the first embodiment.

FIG. 4 is a graph for showing the tracks of the gears' rotation positions in State 1 and State 2. FIG. 5 is a graph for showing the rotation positions of the gears after State 2 in the case where control according to the present invention is not employed.

First, the rotation position of the gear of the POT 12 and the rotation position of the gear of the MOT 13 match with each other in State 1, and the controller 17 controls the MOT 13 with the use of the position information S01, which is the result of detection executed by the POT 12. Next, the gear of the POT 12 in State 2 moves in the driving direction and precedes the gear of the MOT 13 while the rotation position of the gear of the MOT 13 passes the control target position Sct1 as in State 1.

The controller 17 consequently performs feedback control so that the rotation position of the gear of the POT 12 returns to the control target position Sct1, and a control output is generated in a direction opposite from the gear rotation direction of the POT 12 with respect to the control target position Sct1. However, the rotation position of the gear of the POT 12 again falls on a point beyond the control target position Sct1.

The gear rotation position repeatedly overshoots the control target position Sct1 in this manner, which leads to oscillation phenomena.

Control according to the present invention which prevents the oscillation phenomena is described next with reference to FIG. 2 to FIG. 10.

Figure 6:
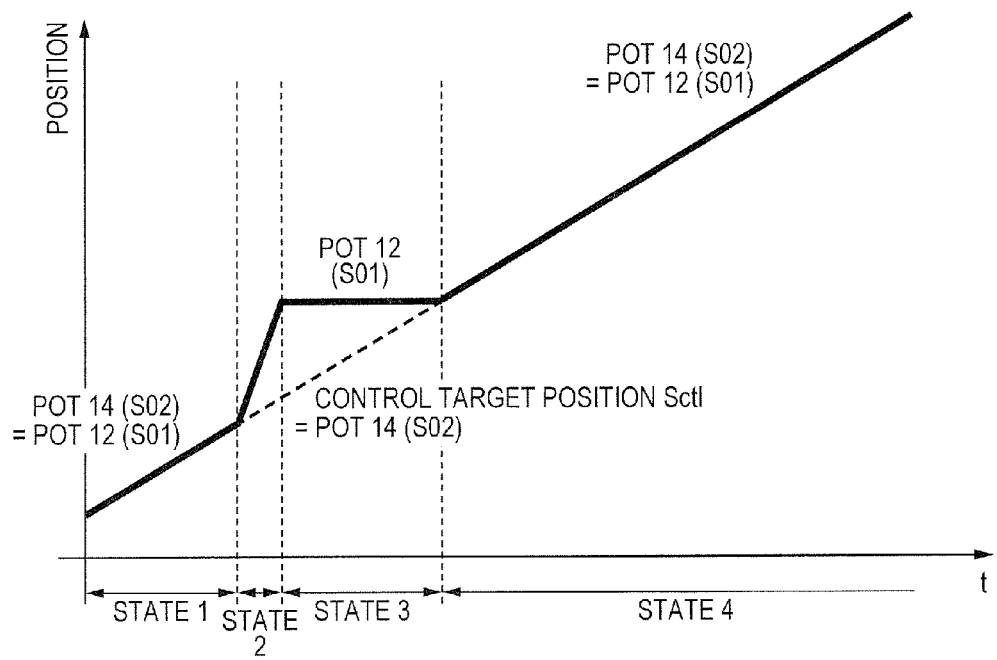
FIG. 6 is a graph for showing the rotation operation of the gears in the first embodiment.
Figure 7:
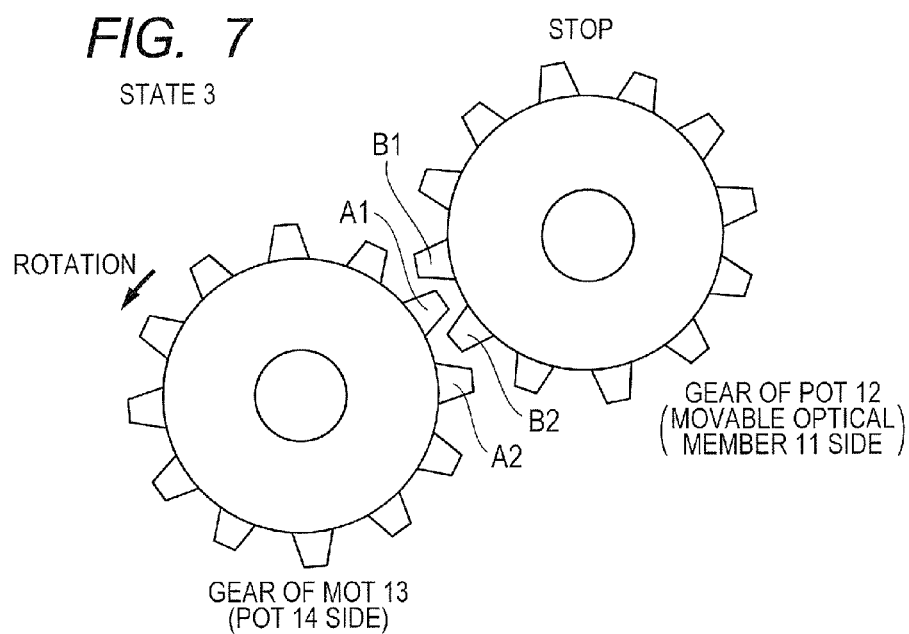
FIG. 7 is a diagram for illustrating an engaged state of the gears in the first embodiment.
Figure 8:
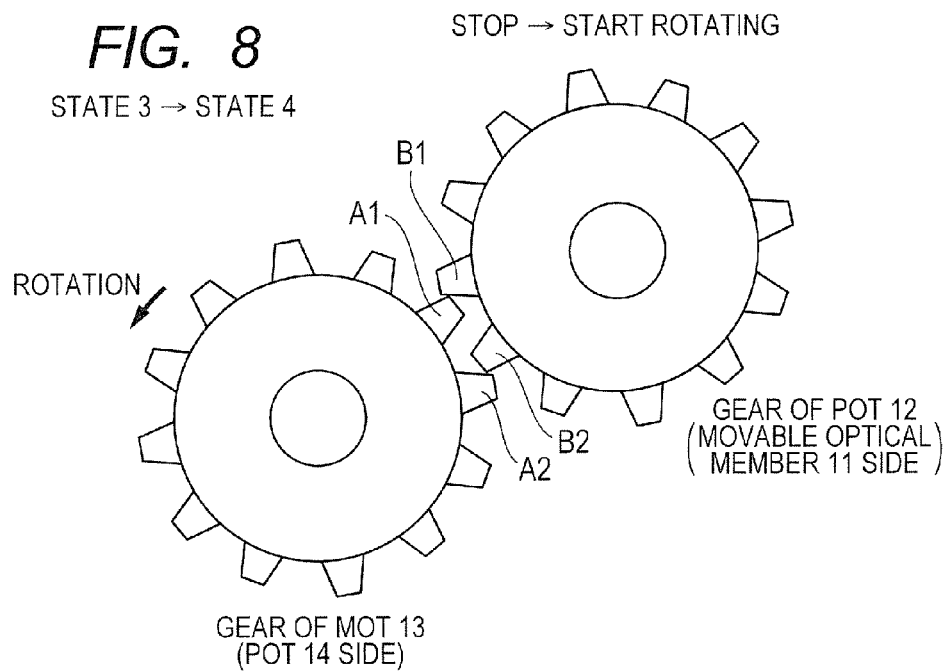
FIG. 8 is a diagram for illustrating an engaged state of the gears in the first embodiment.
Figure 9:
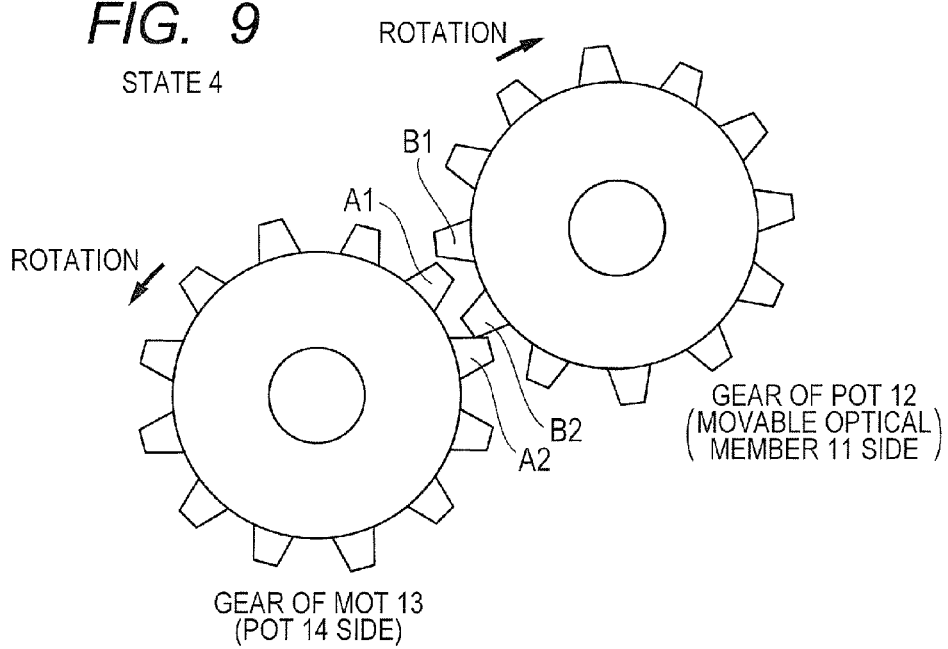
FIG. 9 is a diagram for illustrating an engaged state of the gears in the first embodiment.

FIG. 6 is a graph for showing the rotation positions of the gears in the case where the control according to the present invention is employed and the gear of the POT 12 has come to a stop after State 2.

First, there is no significant difference between the position information S01 of the POT 12 and the position information S02 of the POT 14 in State 1 (see FIG. 2), and the position switcher 16 of FIG. 1 therefore selects and outputs the position information S01. The controller 17 uses this position information S01 to perform feedback control on the MOT 13.

Next, there is a significant difference between the position information S01 of the POT 12 and the position information S02 of the POT 14 in State 2 (see FIG. 3), and the position switcher 16 of FIG. 1 therefore selects and outputs the position information S02. The controller 17 uses this position information S02 to perform feedback control on the MOT 13. Through the feedback control, State 2 of FIG. 3 in which the tooth A1 of the MOT 13 and the tooth B2 of the POT 12 are in contact with each other changes to State 3 in which the driving of the MOT 13 is controlled to rotate until the tooth A1 of the MOT 13 comes into contact with the tooth B1 of the POT 12, which is still at the moment. Also in State 3, there is a significant difference between the position information S01 and the position information S02 (see FIG. 7), and the controller 17 therefore uses the position information S02 to perform feedback control on the MOT 13.

The state in which the tooth A1 of the MOT 13 is brought into contact with the tooth B1 of the stationary POT 12 through the drive control and rotation of the MOT 13 is followed by State 4 in which the stationary POT 12 starts rotating and gear teeth of the MOT 13 rotate while biasing the gear teeth of the POT 12 toward the rotation direction. Lastly, the difference between the position information S01 of the POT 12 and the position information S02 of the POT 14 becomes equal to or smaller than a given value in State 4 (see FIG. 8 and FIG. 9), and the position switcher 16 of FIG. 1 selects and outputs the position information S01. The controller 17 uses this position information S01 to perform feedback control on the MOT 13. During the shifts of control from State 1 to State 4, the control target position Sct1 is kept output under constant control (for example, uniform motion shown in FIG. 6) whichever of the position information S01 and the position information S02 is employed as a signal to be fed back to control.

Details of the control method according to the present invention are described next with reference to FIG. 10.

Figure 10:
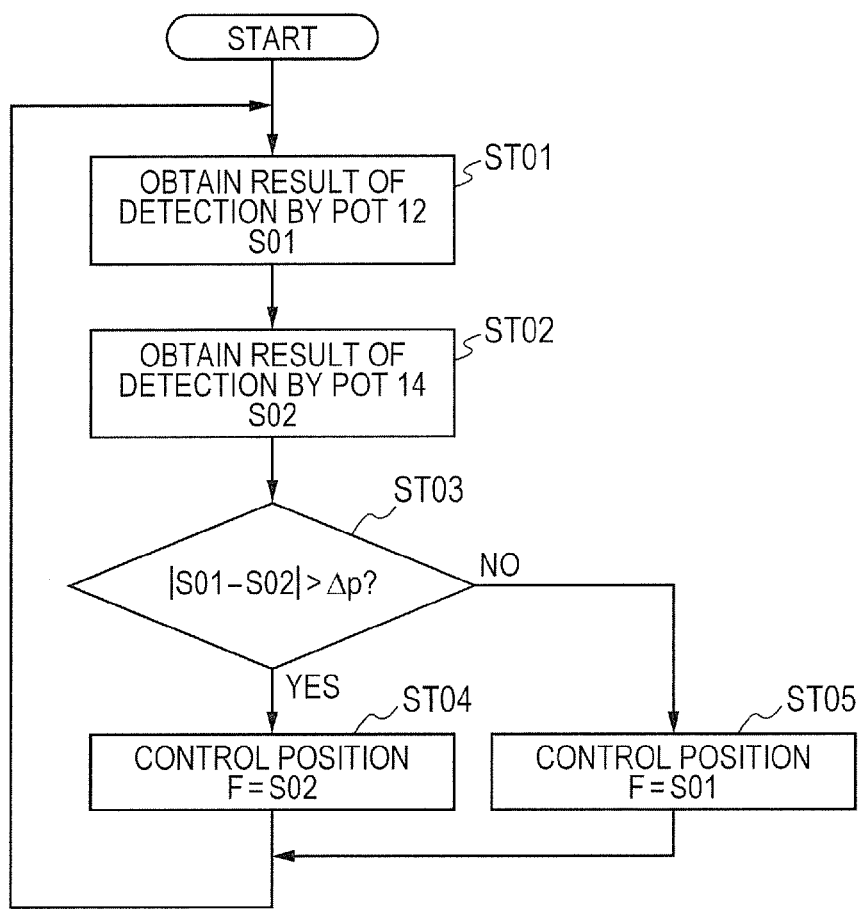
FIG. 10 is a flow chart for illustrating a control method that is used by the drive control apparatus of the first embodiment.

FIG. 10 is a flow chart for illustrating the control method of the present invention.

In Step ST01, the detection result (S01) of the POT 12 is obtained first. In Step ST02, the detection result (S02) of the POT 14 is obtained next. In Step ST03, a difference between S01 and S02 (|S01−S02|) is calculated. The control method proceeds to Step ST04 in the case where the difference exceeds a given value Δp, and to Step ST05 in the case where the difference is equal to or smaller than the given value Δp. In Step ST04, the position switcher 16 selects the position information S02 out of the position information S01 and the position information S02 that have been input to the position switcher 16, and outputs the position information S02 to the controller 17. The controller 17 performs feedback control on the MOT 13 with the use of the position information S02. In Step ST05, on the other hand, the position switcher 16 selects the position information S01 out of the position information S01 and the position information S02 that have been input to the position switcher 16, and outputs the position information S01 to the controller 17. The controller 17 performs feedback control on the MOT 13 with the use of the position information S01.

The control according to the present invention thus uses in a normal state (State 1 and State 4) the POT 12, which is capable of detecting the rotation position of the movable optical member 11 more accurately (because placed next to the movable optical member 11). In a state where the difference between the position information of the POT 12 and the position information of the POT 14 is greater than a given value and oscillation is a possibility (State 2 and State 3), the present invention uses position information output from the POT 14, which is capable of detecting the rotation position of the MOT 13 serving as a control target more accurately (because placed next to the MOT 13), to control the MOT 13.

Configured as described above, the lens apparatus of this embodiment is capable of preventing oscillation phenomena (see FIG. 5) which is an effect of the present invention, and also has an effect in that the rotation position of the movable optical member can be detected and controlled with precision in a normal state where the chance of oscillation phenomena is small.

Second Embodiment

A lens apparatus according to a second embodiment of the present invention is described with reference to FIG. 1, FIG. 5 to FIG. 9, and FIG. 11 to FIG. 16.

This embodiment differs from the first embodiment in the movement of the POT 12, which is configured to detect the rotation position of the movable optical member 11, but has the same basic configuration as that of the lens apparatus 1 described in the first embodiment. Descriptions on components of the second embodiment that overlap with components of the first embodiment are therefore omitted. The following description about the lens apparatus of this embodiment focuses on the difference from the configuration of the first embodiment.

FIG. 12 and FIG. 14 to FIG. 16 are schematic diagrams for illustrating an engaged state of the gear of the POT 12 and the gear of the MOT 13, and rotation directions, gear teeth names, and the like in FIG. 12 and FIG. 14 to FIG. 16 are the same as in the first embodiment.

Figure 11:
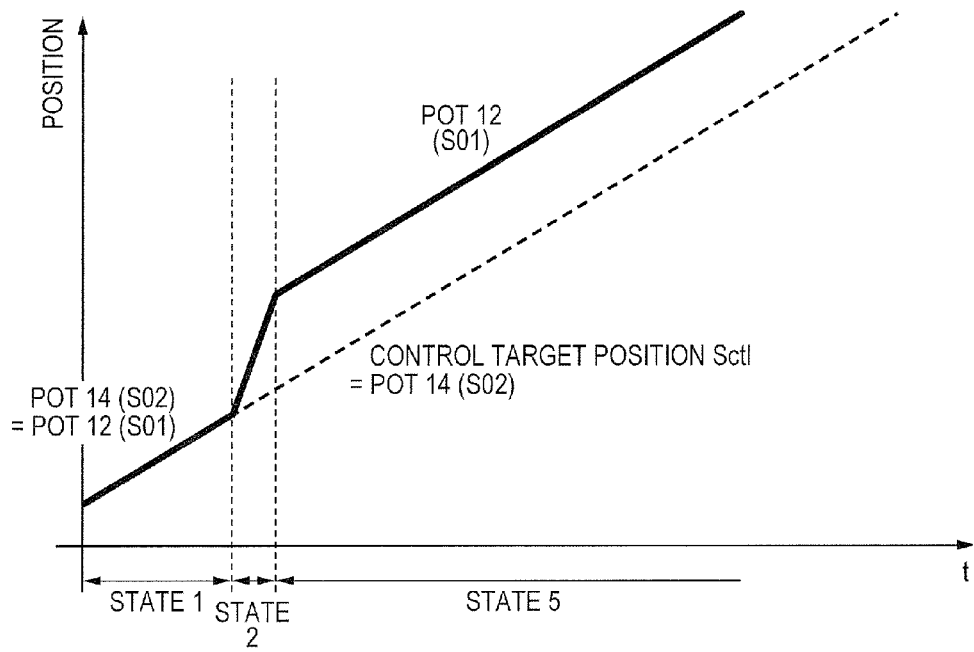
FIG. 11 is a graph for showing the rotation operation of gears in a second embodiment of the present invention.

FIG. 11 is a graph for showing the rotation positions of the gears in the case where control according to the present invention is employed. In the case illustrated in FIG. 11, the gear of the POT 12 continues to rotate after State 2 from its position in FIG. 6 of the first embodiment, at the same speed as the gear of the MOT 13 (this state is referred to as "State 5").

In State 5 (see FIG. 12), when the difference |S01–S02| exceeds Δp in Step ST03 of the processing of the first embodiment that is illustrated in the flow chart of FIG. 10, the position switcher 16 selects the position information S02 out of the position information S01 and the position information S02 and outputs the position information S02 to the controller 17 in Step ST04. The controller 17 uses the position information S02 to perform feedback control on the MOT 13.

Figure 12:
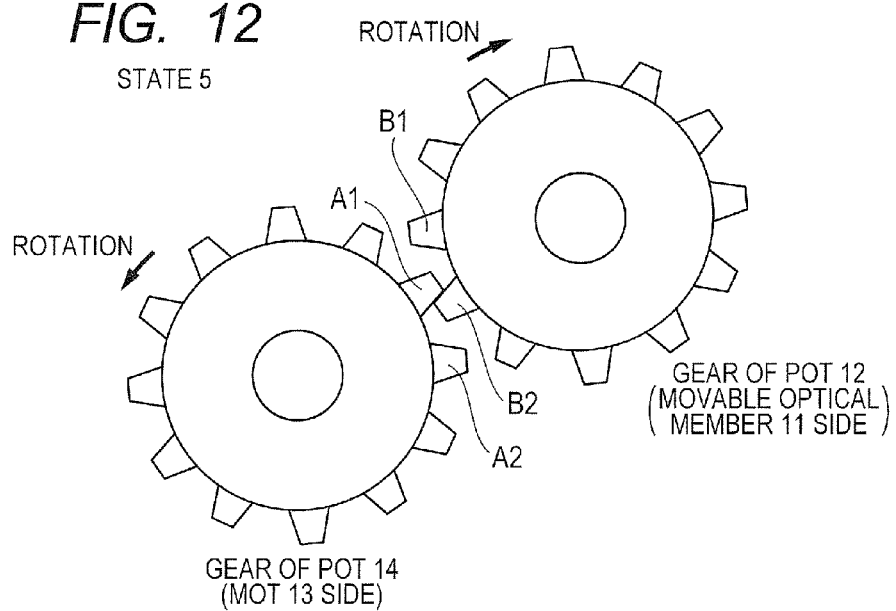
FIG. 12 is a diagram for illustrating an engaged state of the gears in the second embodiment.

FIG. 12 is a diagram for illustrating a case in which the gear of the POT 12 maintains State 5 once after State 2, and comes to a stop as in the first embodiment.

Figure 13:
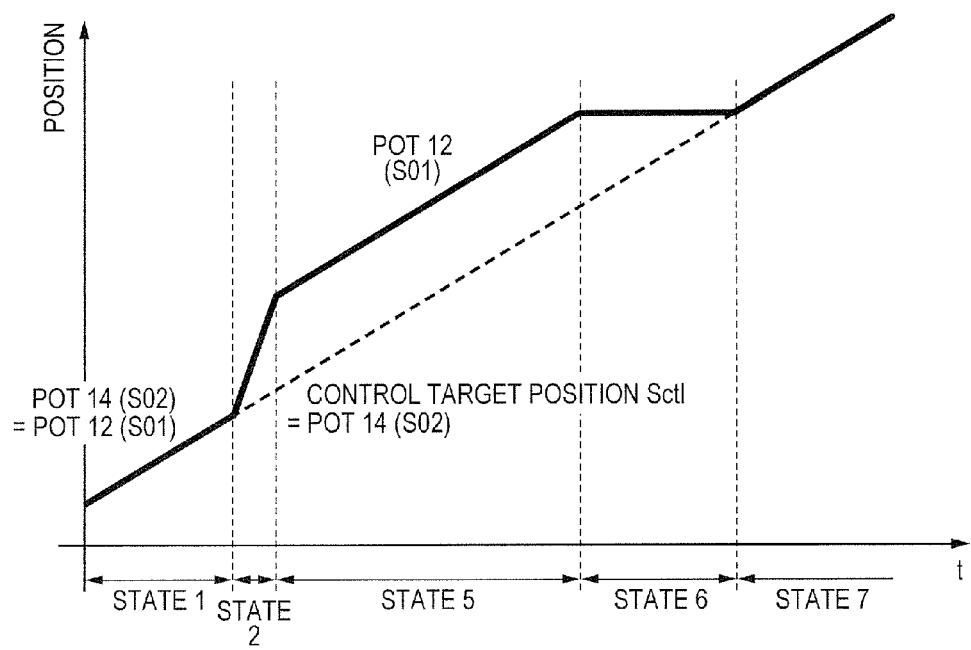
FIG. 13 is a diagram for illustrating the rotation operation of the gears in the second embodiment.
Figure 14:
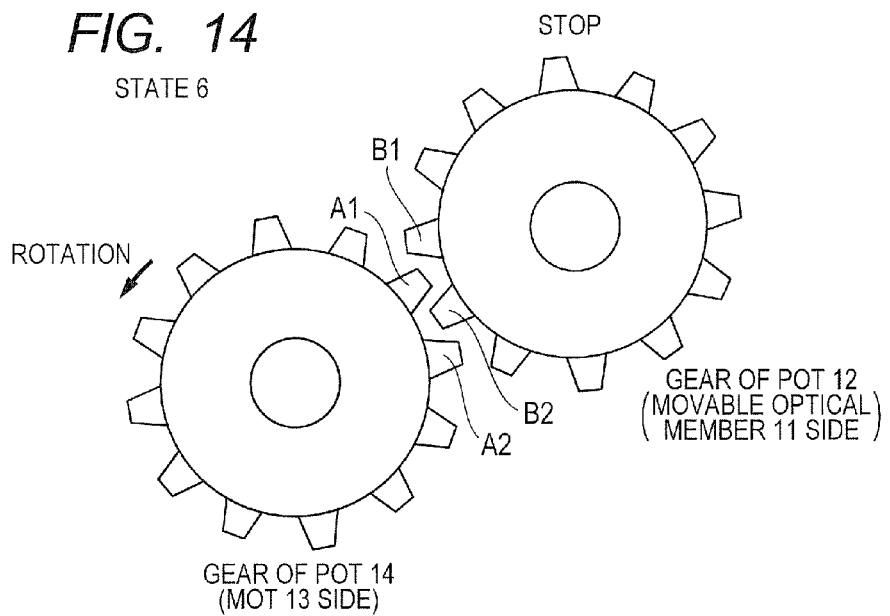
FIG. 14 is a diagram for illustrating an engaged state of the gears in the second embodiment.

State 6 and State 7 (FIG. 14, FIG. 15, and FIG. 16) in FIG. 13 correspond to State 3 and State 4, respectively, of the first embodiment (see FIG. 6, FIG. 7, FIG. 8, and FIG. 9). In State 6, there is a significant difference between the position information S01 and the position information S02 as in State 3. The position switcher 16 therefore selects the position information S02 out of the position information S01 and the position information S02, and outputs the position information S02 to the controller 17. The controller 17 uses the position information S02 to perform feedback control on the MOT 13.

In State 7, the difference between the position information S01 of the POT 12 and the position information S02 of the POT 14 is equal to or smaller than the given value as in State 4 (see FIG. 15 and FIG. 16). The position switcher 16 therefore selects the position information S01 out of the position information S01 and the position information S02, and outputs the position information S01 to the controller 17. The controller 17 uses the position information S01 to perform feedback control on the MOT 13.

Figure 5:
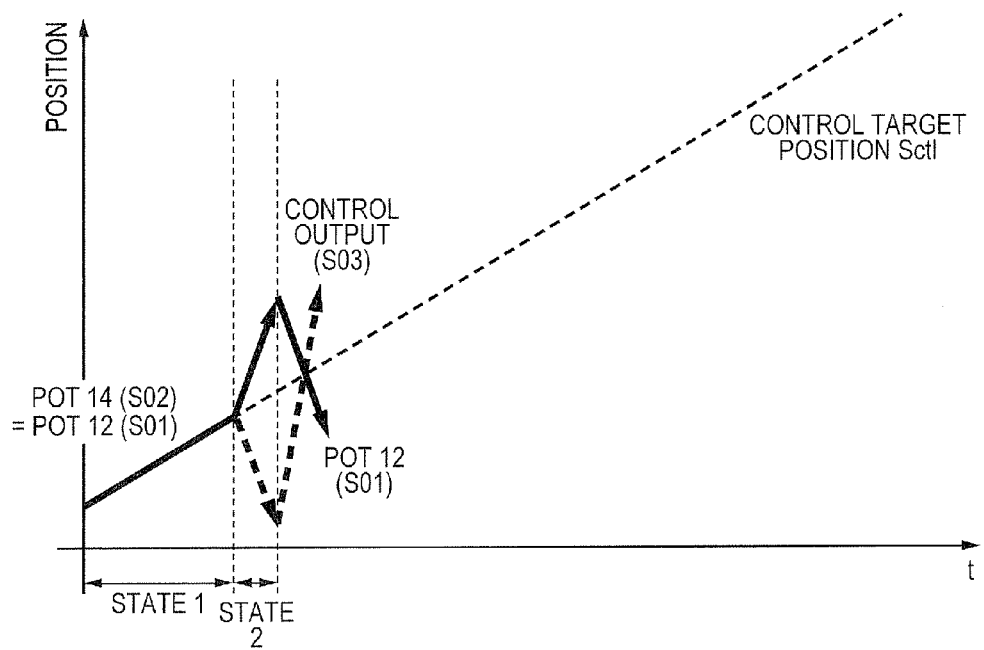
FIG. 5 is a graph for showing the rotation operation of the gears in the first embodiment.

Thus, the chances of the oscillation phenomena described in the first embodiment with reference to FIG. 5 are high also when the gear of the POT 12 accidentally rotates at the same speed as the gear of the MOT 13 without the MOT 13 driving the POT 12, and some external factor causes sudden acceleration/deceleration of the gear of the POT 12 because the MOT 13 is not driving the POT 12. However, such oscillation can be prevented in advance by controlling the MOT 13 with the use of the position information S02 in the manner described in this embodiment.

Third Embodiment

A lens apparatus according to a third embodiment of the present invention is described with reference to FIG. 1, FIG. 17, and FIG. 18.

This embodiment differs from the first embodiment in that control using a voltage between terminals of the MOT 13 is executed in place of control using the position information of the POT 14, and in that speed feedback control is executed in place of position feedback control. The rest of the basic configuration of the third embodiment is the same as that of the lens apparatus 1 described in the first embodiment. Descriptions on components of the third embodiment that overlap with components of the first embodiment are therefore omitted. The following description about the lens apparatus of this embodiment focuses on the differences from the configuration of the first embodiment.

Figure 17:
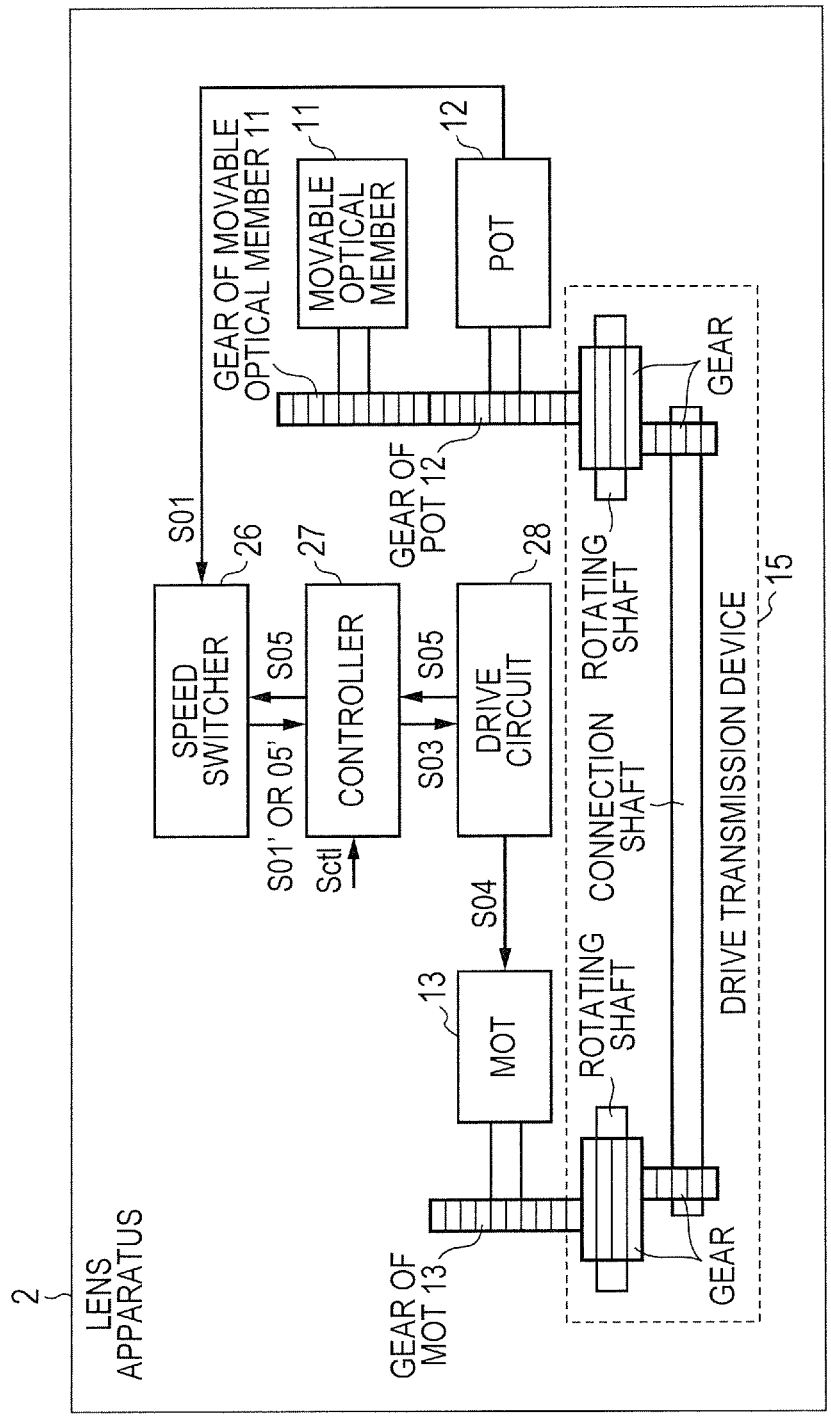
FIG. 17 is a function block diagram of a lens apparatus 2 that includes a drive control apparatus according to a third embodiment of the present invention.

FIG. 17 is a function block diagram of a lens apparatus 2 of this embodiment.

Unlike the lens apparatus 1 of the first embodiment, the lens apparatus 2 of this embodiment does not include the POT 14 configured to detect the position of the MOT 13, and includes, in place of the position switcher 16, the controller 17, and the drive circuit 18, a speed switcher 26, a controller 27, and a drive circuit 28, which have different functions from the functions of their counterparts in the lens apparatus 1.

Functional differences of those components from the ones in the first embodiment are described below.

The drive circuit 28 outputs a drive voltage signal (hereinafter referred to as "drive voltage S05") of the MOT 13 to the controller 27. The position information S01 output by the POT 12 and the drive voltage S05 output by the drive circuit 28 are input to the speed switcher 26. The speed switcher 26 converts the input position information S01 and drive voltage S05 separately into speeds to generate a speed information S01' from the position information S01 and to generate a speed information S05' from the drive voltage S05. The speed switcher 26 outputs to the controller 27 one of the speed information S01' and the speed information S05' based on the difference between the speed information S01' and the speed information S05'. A control target speed Sct1' and one of the speed information S01' and the speed information S05' are input to the controller 27, and the controller 27 performs speed feedback control on the MOT 13.

Details of the control method according to the present invention are described next with reference to FIG. 18.

Figure 18:
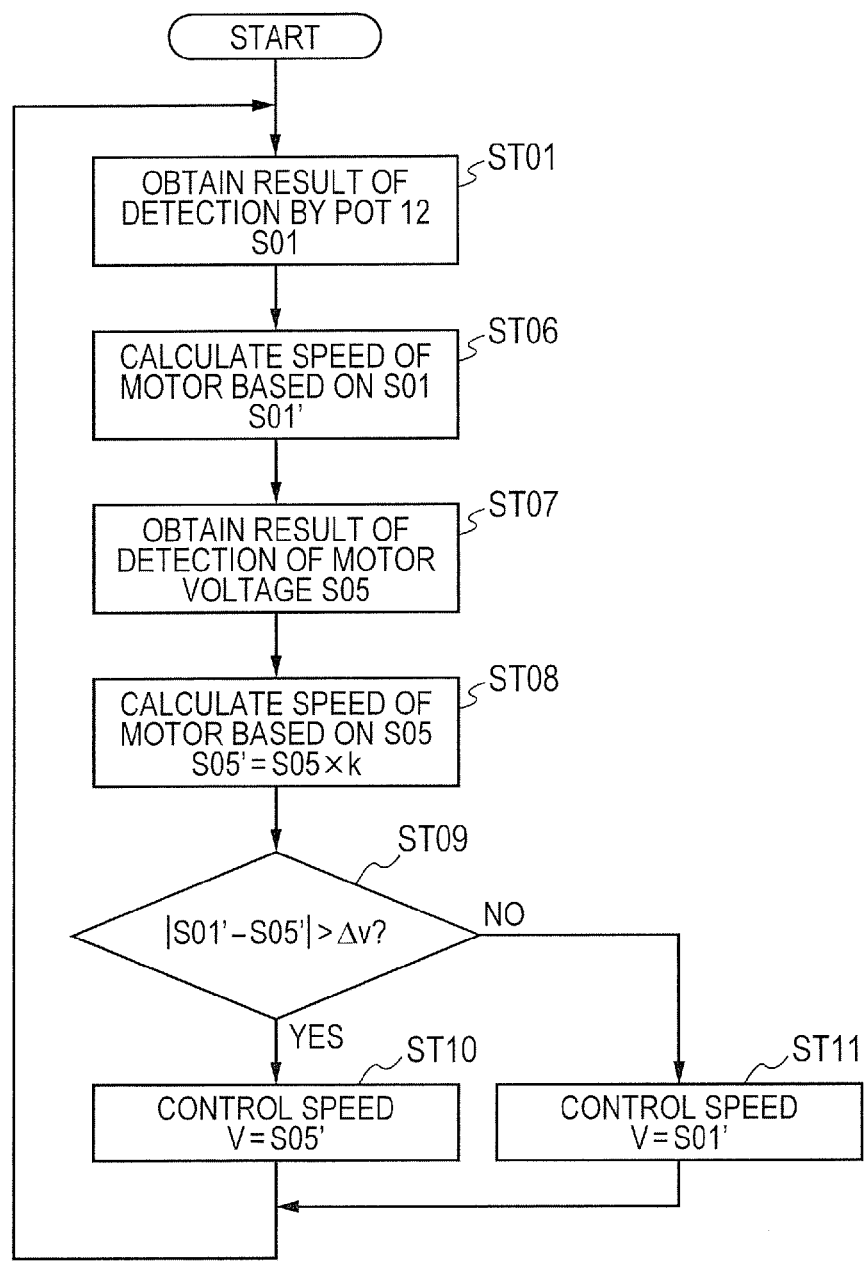
FIG. 18 is a flow chart for illustrating a control method that is used by the drive control apparatus of the third embodiment.

FIG. 18 is a flow chart for illustrating the control method of the present invention.

In Step ST01, the position detection result (S01) of the POT 12 is obtained first. In Step ST06, the position detection result (S01) of the POT 12 is converted into the speed information S01'. In Step ST07, a voltage between terminals of the MOT 13 is detected to obtain the motor drive voltage S05. In Step ST08, the speed information S05' of the MOT 13 is calculated from the motor drive voltage S05. In Step ST09, a difference between S01' and S05' (|S01'–S05'|) is calculated. The control method proceeds to Step ST10 in the case where the difference exceeds a given value Δv, and proceeds to Step ST11 in the case where the difference is equal to or smaller than the given value Δv. In Step ST10, the speed switcher 26 selects the speed information S05' and outputs the speed information S05' to the controller 27. The controller 27 uses the speed information S05' to perform speed feedback control on the MOT 13. In Step ST11, the speed switcher 26 selects and outputs the speed information S01', and the controller 27 uses the speed information S01' to perform speed feedback control on the MOT 13.

The third embodiment, where the rotation speed of the MOT 13 is used in feedback control of the MOT 13 when there is a significant difference in rotation speed between the MOT 13 and the POT 12, is thus capable of preventing oscillation as the first embodiment and the second embodiment are. In addition, the lens apparatus of the third embodiment which does not need the POT 14 to detect the rotation position or speed of the MOT 13 can accordingly be reduced in size, weight, and cost.

The drive voltage and motor rotation speed of the MOT 13, which is a DC motor, can generally be expressed in a proportional relationship. However, noise that is generated by a contact between a brush and a commutator inside the motor is often superimposed on the drive voltage. It is therefore more desirable to use an averaged drive voltage in control in the case where a feedback system is built with the use of the drive voltage of the MOT 13.

While the third embodiment discusses an example in which the speed information S05' of the MOT 13 is obtained from the motor drive voltage S05, the present invention is not limited thereto. For instance, a counter electromotive force may be derived from the drive voltage and drive current of the DC motor to evaluate a load on the DC motor based on the counter electromotive force and to use the load as a signal to be fed back to the drive control of the motor.

Fourth Embodiment

A lens apparatus according to a fourth embodiment of the present invention is described with reference to FIG. 19 to FIG. 22.

In the methods described in the first embodiment to the third embodiment, control is executed with the use of position information or the drive voltage of the MOT 13 (or the POT 14 placed next to the MOT 13), which is a drive target, in order to prevent oscillation phenomena. In the case of making an optical state correction on an image such as a correction of the angle of view, however, more accurate position information of the movable optical member is needed beside position information that is used in the control of the MOT 13.

Thus, in this embodiment, a case in which the angle of view is corrected is described below.

Figure 19:
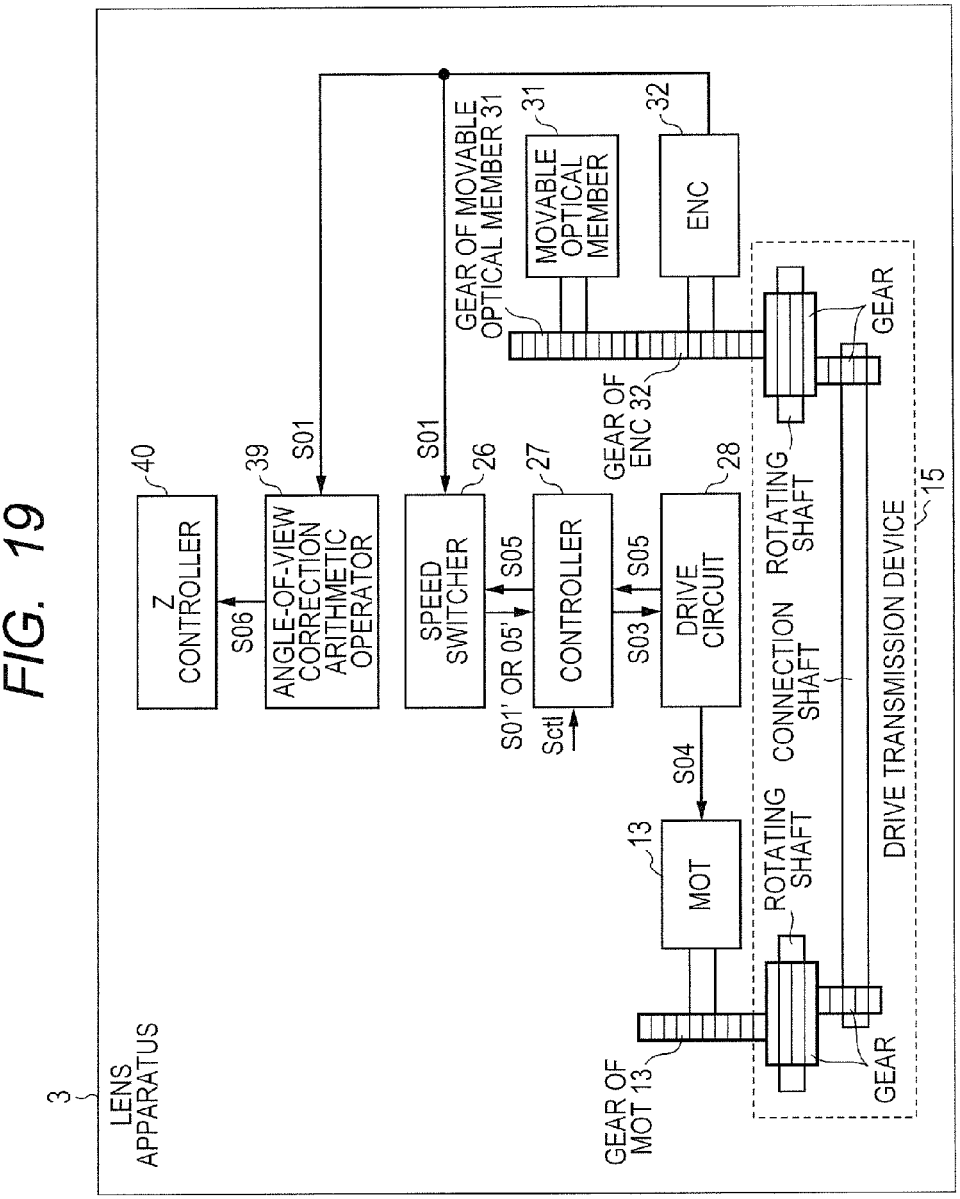
FIG. 19 is a function block diagram of a lens apparatus 3 that includes a drive control apparatus according to a fourth embodiment of the present invention.

The configuration of a lens apparatus 3 according to this embodiment is outlined in FIG. 19, and differs from the lens apparatus 2 of the third embodiment in that a movable optical member 31 and an encoder ENC 32 (hereinafter referred to as "ENC 32") are included in place of the movable optical member 11 and the POT 12, respectively, and in that an angle-of-view correction arithmetic operator 39 (a corrector) and a Z controller 40 are additionally included.

Figure 21:
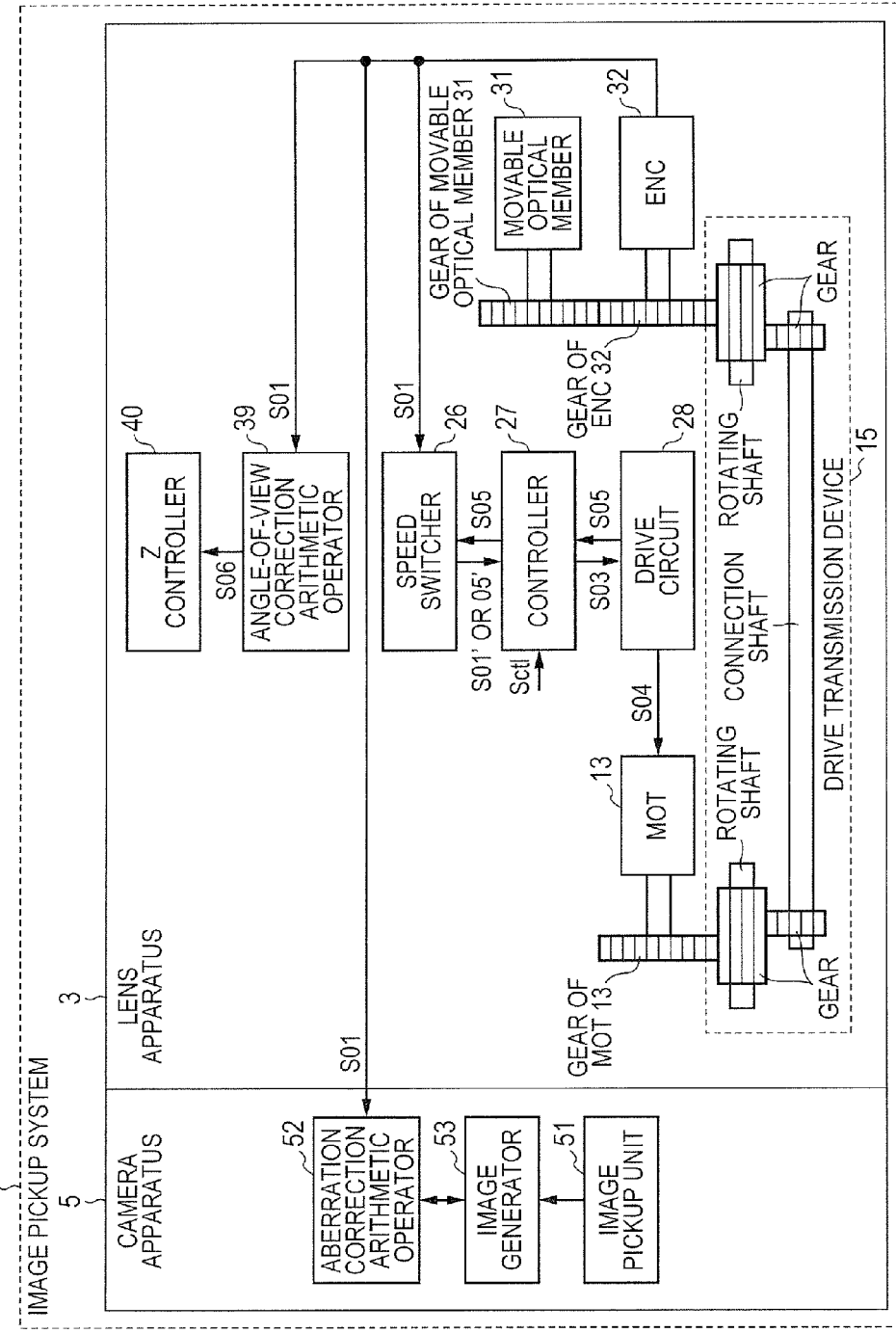
FIG. 21 is a function block diagram of an image pickup system according to a fifth embodiment of the present invention.

FIG. 21 is a function block diagram of an image pickup system 6, which includes the lens apparatus 3 of this embodiment and a camera apparatus 5.

The movable optical member 31 includes a lens unit having a well-known movable mechanism that is mounted to the lens apparatus. The lens unit in this embodiment is a zoom lens unit for varying the power of the lens apparatus, and has a gear used to drive the movable mechanism. The gear is connected to a gear of the ENC 32.

The encoder ENC 32 is a well-known, rotary-type encoder, and has a gear on a rotating shaft. The gear of the ENC 32 is connected to the gear of the movable optical member 31 and one of the gears of the drive transmission device 15 to detect a rotation position, and to output the position information S01.

The position information output by the ENC 32 is generally in the form of a digital pulse waveform or an analog sine waveform. However, the configuration of the waveform is irrelevant to the essence of the present invention, and the position information of the ENC 32 is therefore treated as the same as the position information S01 of the POT 12 in the first embodiment to the third embodiment.

The angle-of-view correction arithmetic operator 39 generates a control for controlling the driving of the zoom lens unit (not shown), which is included in the lens apparatus 3, in order to correct a change in the angle of view that is caused by the movement of a focus lens unit for adjusting the focus of the lens apparatus 3 of this embodiment when the focus lens unit is put into operation. The position of the zoom lens unit and the position of the focus lens unit are necessary to correct a change in the angle of view that is caused when the focus lens unit is put into operation. The position information S01 of the zoom lens unit which is output by the ENC 32 and position information from a position detector (not shown) of the focus lens unit are input to the angle-of-view correction arithmetic operator 39. The angle-of-view correction arithmetic operator 39 outputs a zoom control signal S06 to the Z controller 40. The zoom control signal S06 is input to the Z controller 40, and the Z controller 40 controls the zoom lens unit for varying the power of the lens apparatus 3.

The lens apparatus 3 includes, other than the zoom-system components illustrated in FIG. 21, a drive circuit for focus driving, a focus motor for driving, the position detector configured to detect the position of the focus lens unit, a drive transmission device connecting the focus motor to a movable member of the focus lens unit, and the like. The position of the focus lens unit is input to the angle-of-view correction arithmetic operator 39 from the position detector to be used in a calculation for the correction of the angle of view.

Figure 20:
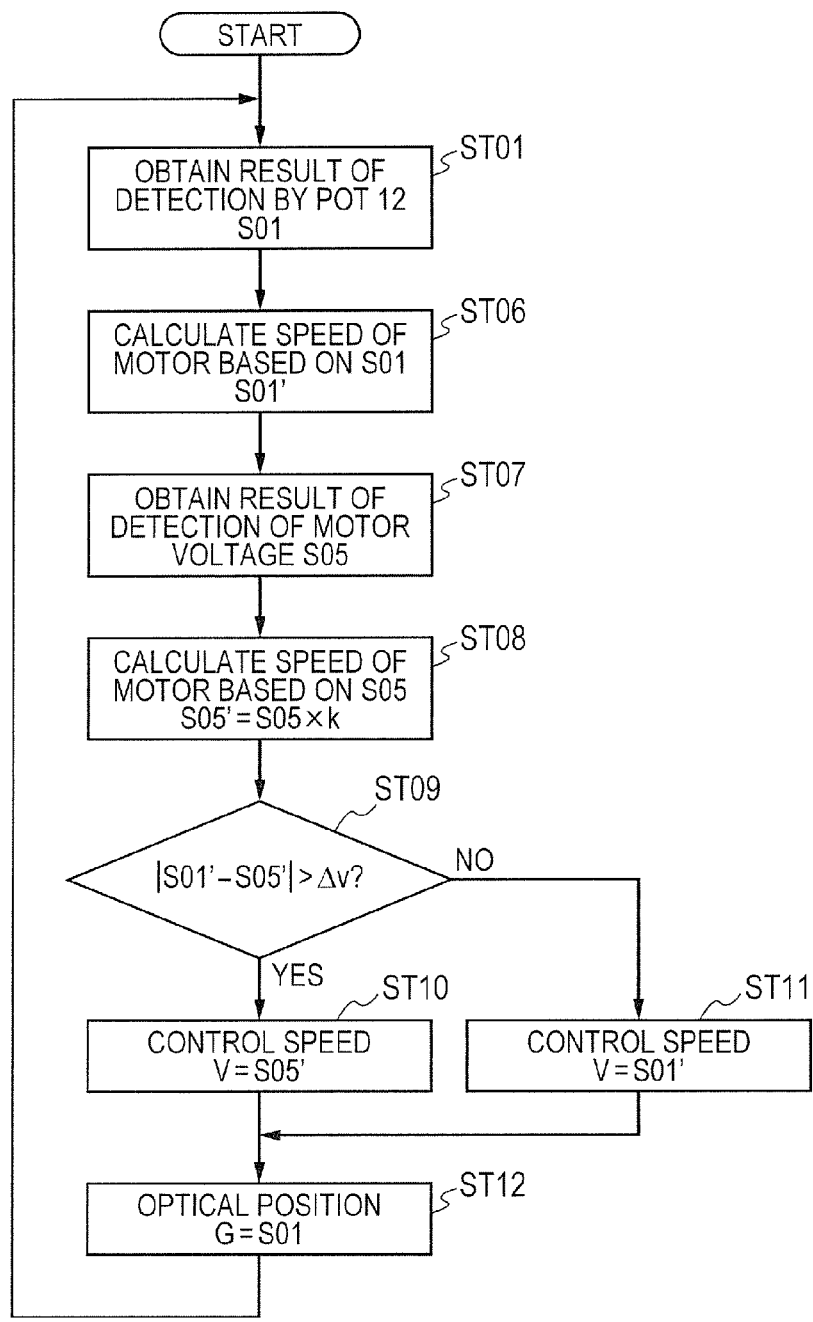
FIG. 20 is a flow chart for illustrating a control method that is used by the drive control apparatus of the fourth embodiment.

FIG. 20 is a flow chart for illustrating the control method of the present invention.

The flow chart of FIG. 20 differs from the flow chart of FIG. 18 of the third embodiment in that Step ST12 is added to use the position information of the ENC 32 always as the position (optical position G) of the zoom lens unit.

The position information of the ENC 32, which is capable of detecting the position of the movable optical member (zoom lenses) 31 more accurately (because placed next to the movable optical member 31), can thus always be used as the position of the zoom lens unit which is used in the correction of the angle of view, even when the drive voltage of the MOT 13 is selected and used by the speed switcher 26 in the drive control of the movable optical member 31.

The fourth embodiment discusses an example a case in which the lens apparatus uses position information that is provided by an encoder placed next to the movable optical member as a more accurate zoom lens position, which is needed by the angle-of-view correction arithmetic operator in angle-of-view correction necessary for focus operation, even when the driving of the zoom lenses is controlled based on speed information that is provided by the drive motor. Similarly, the configuration described above can be applied as it is to obtain a more accurate focus lens position, which is needed by the angle-of-view correction arithmetic operator in angle-of-view correction necessary for focus operation. In short, one of driver-side drive information (in the form of position or speed) and driven-side drive information (in the form of position or speed) is selected based on the difference between the two, to be used in the drive control of the focus lenses via the drive transmission device that has play in the drive system. In this drive control, focus lens position information that is provided by the encoder placed next to the focus lens unit is used in a calculation for the correction of the angle of view even when the driver-side drive information is used, thereby accomplishing angle-of-view correction that is even higher in precision.

Fifth Embodiment

An image pickup system according to a fifth embodiment of the present invention is described.

FIG. 21 is a function block diagram for illustrating the image pickup system 6, which includes the lens apparatus 3 of the fourth embodiment and the camera apparatus 5 having an aberration correction function.

The camera apparatus 5 includes an image pickup unit 51 configured to pick up an optical image formed by the lens apparatus 3 and to output image pickup data, an aberration correction arithmetic operator 52 configured to output aberration correction data for correcting various optical aberrations that are contained in the optical image, and an image generator 53 configured to generate an image based on the image pickup data and the aberration correction data.

The aberration correction arithmetic operator 52 generates the aberration correction data based on the position information S01 output by the lens apparatus 3. Other types of information than the position information S01, such as zoom position information and diaphragm position information of the lens apparatus 3, may also be taken into consideration in aberration correction.

In this manner, when angle-of-view correction, image correction, or the like is made based on accurate information about the state of optical apparatus (such as the position of the movable optical component) regardless of inside or outside the lens apparatus, one of driver-side drive information (in the form of position or speed) and driven-side drive information (in the form of position or speed) is selected based on the difference between the two, to be used in the drive control of the movable optical member 31 via the drive transmission device that has play. In this drive control, position information of the ENC 32, which is capable of detecting the position of the movable optical member 31 more accurately (because placed next to the movable optical member 31) is used even when the driver-side drive information is used, thereby accomplishing precise angle-of-view correction, image correction, or other similar correction.

An image pickup system that is a derivative of the fifth embodiment of the present invention is described with reference to FIG. 22.

Figure 22:
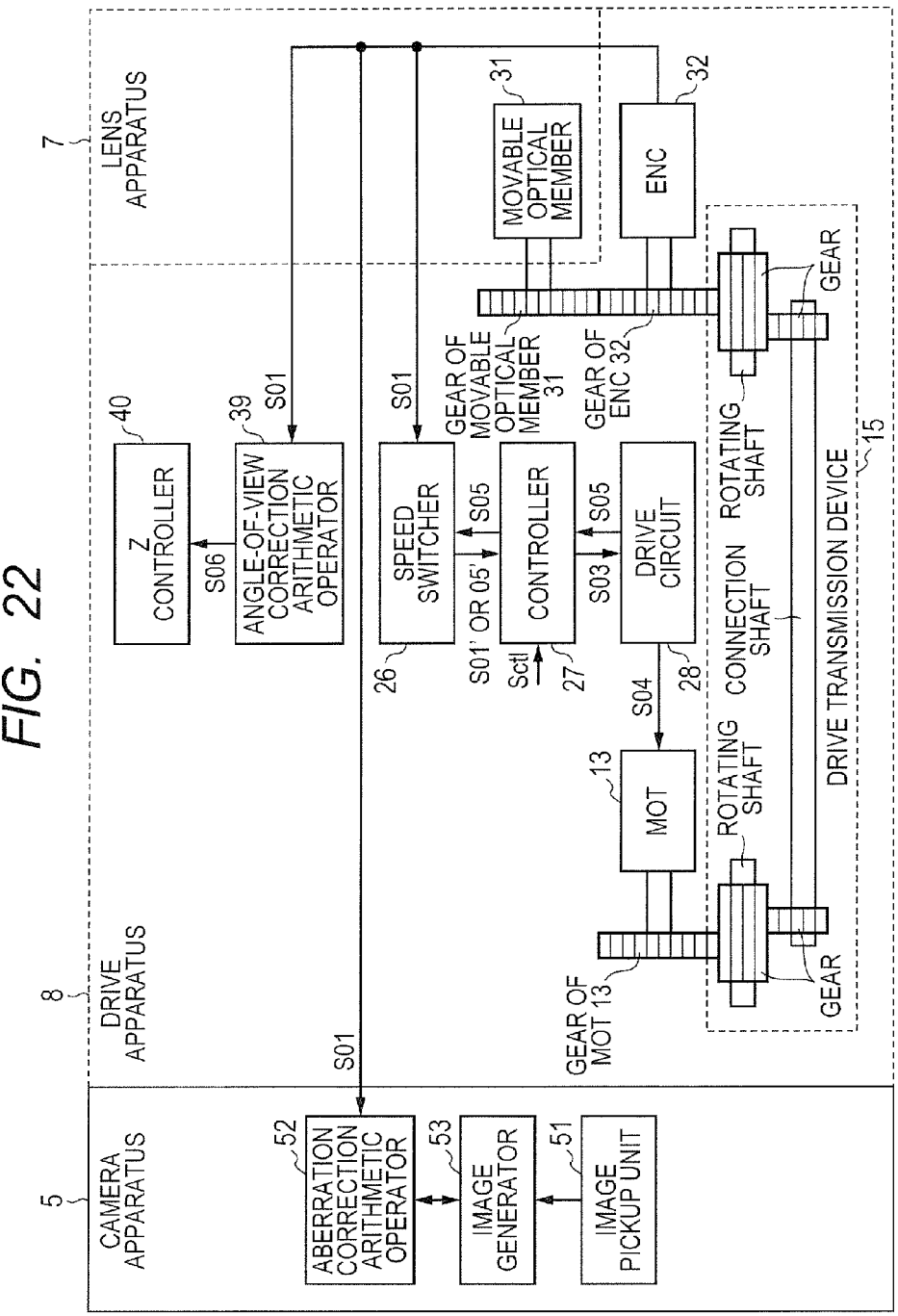
FIG. 22 is a function block diagram of an image pickup system that is a derivative of the fifth embodiment.

The image pickup system according to an embodiment of the present invention illustrated in FIG. 22 has a form in which the lens apparatus 3 inside the image pickup system of the fifth embodiment which is illustrated in FIG. 21 is divided into a lens apparatus 7 and a drive apparatus 8. The lens apparatus 7 includes the movable optical member 31, and the drive apparatus 8 includes the other components of the lens apparatus 3 than the movable optical member 31. There is no essential difference in overall function as an image pickup system between the image pickup system 6 of FIG. 21 and the image pickup system of FIG. 22. The only difference is that the lens apparatus 3 inside the image pickup system 6 of FIG. 21 is configured as separate apparatus, the lens apparatus 7 and the drive apparatus 8, in the image pickup system of FIG. 22 to be mounted to each other for use.

In this manner, when angle-of-view correction, image correction, or the like is made based on accurate information about the state of optical apparatus (such as the position of the movable optical component) regardless of inside or outside the lens apparatus, one of driver-side drive information (in the form of position or speed) and driven-side drive information is selected based on the difference between the two, to be used in the drive control of the movable optical member 31 via the drive transmission device that has play. In this drive control, position information of the ENC 32, which is capable of detecting the position of the movable optical member 31 more accurately (because placed next to the movable optical member 31) is used even when the driver-side drive information is used, thereby executing precise angle-of-view correction, image correction, or other similar correction.

In any of the embodiments described above, direct position detection and direct driving of the movable optical member, which is the ultimate control target of the lens apparatus, without an intervening component, e.g., a drive transmission device is desirable in truth.

However, actual lens apparatus need to use a drive transmission device due to difficulties in securing an installation space and the like. The use of a gear train is also necessary in order to secure a speed reduction ratio for reasons such as the drive performance of the motor and the detection precision of the position detector.

In the case where the position of the movable optical member needs to be obtained for optical aberration correction or the like in a camera that is run as a set with lenses, the position of the movable optical member needs to be detected in manual operation of the movable optical member as well, which makes placing the motor and the position detector apart from each other a preferred arrangement. The movable optical member of the lens apparatus, the position detector configured to detect the position of the movable optical member, and the motor configured to drive the movable optical member are therefore put in places apart from one another in many cases, while allowing for mechanical play between the components.

When gravity is applied to the movable optical member in this type of lens apparatus, with a difference in posture created between the components, for example, the movable optical member is moved within the extent of the play irrespective of the motor's driving, which can trigger oscillation phenomena.

The present invention can provide a technology with which oscillation phenomena caused in the manner described above are prevented and the accurate position of the movable optical member can always be detected as well to carry out the optical aberration correction or other similar correction with precision.

Cases that require the detection of the accurate position of the movable optical member include, other than the angle-of-view correction and image correction given as examples, a case in which an image is output to a virtual system configured to composite CG images.

The type of the MOT 13 is not limited to DC motors. While the embodiments described above discuss as an example a case in which the drive voltage of the MOT 13 is used to detect speed information, the rotation position or speed of the motor may be detected from the drive current or voltage (waveform) of the motor irrespective of the type of the motor. The speed calculated from the drive voltage in the embodiments may be converted into a position to feed back the position.

The method of controlling the MOT 13 is also not limited to the control methods of the embodiments, and speed feedback control and position feedback control may be combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-127952, filed Jun. 25, 2015, which is hereby incorporated by reference herein in its entirety.

What is claimed is:

1. A drive control apparatus, comprising:
a motor;
a transmission device including a gear and configured to transmit a driving force of the motor to a movable member;
a first detector provided on a side of the movable member with respect to the transmission device and configured to detect a driving state of the movable member;
a second detector provided on a side of the motor with respect to the transmission device and configured to detect a driving state of the movable member; and
a controller configured to control the motor,
wherein the controller is configured to
control the motor based on a first detection result obtained by the first detector in a case where a difference between the first detection result and a second detection result obtained by the second detector does not exceed a given value, and control the motor based on the second detection result in a case where the difference exceeds the given value.

2. The drive control apparatus according to claim 1, wherein each of the first detector and the second detector is configured to detect a position of the movable member.

3. The drive control apparatus according to claim 1, wherein the first detector is configured to detect a position of the movable member, and the second detector is configured to detect a speed of the movable member.

4. The drive control apparatus according to claim 1, wherein the transmission device includes a connection shaft.

5. The drive control apparatus according to claim 1, wherein the second detector a position detector connected to the motor via a gear.

6. The drive control apparatus according to claim 1, wherein the second detector is configured to detect a drive voltage of the motor or a drive current of the motor as the driving state of the movable member.

7. The drive control apparatus according to claim 6, wherein the motor comprises a DC motor, and
wherein the controller is configured to control the motor based on a counter electromotive force that is derived from the drive voltage and the drive current of the DC motor.

8. The drive control apparatus according to claim 1, wherein the controller is configured to, whichever of the first detection result and the second detection result is used as a feedback signal, control the motor based on the same control target value.

9. A lens apparatus comprising:
a movable optical member;
a drive control apparatus, the drive control apparatus comprising:
a motor;
a transmission device including a gear and configured to transmit a driving force of the motor to the movable optical member;
a first detector provided on a side of the movable optical member with respect to the transmission device and configured to detect a driving state of the movable optical member;
a second detector provided on a side of the motor with respect to the transmission device and configured to detect a driving state of the movable optical member; and
a controller configured to control the motor,
wherein the controller is configured to
control the motor based on a first detection result obtained by the first detector in a case where a difference between the first detection result and a second detection result obtained by the second detector does not exceed a given value, and control the motor based on the second detection result in a case where the difference exceeds the given value.

10. The lens apparatus according to claim 9,
wherein the lens apparatus comprises, as the movable optical member, a focus lens unit and a zoom lens unit, and
wherein the lens apparatus is configured to correct a change in an angle of view of the lens apparatus that is caused by operation of the focus lens unit, based on the first detection result on the focus lens unit or the first detection result on the zoom lens unit or both thereof.

11. An image pickup system comprising:
a lens apparatus; and
an image pickup element configured to pick up an image formed by the lens apparatus,
wherein the lens apparatus comprising a drive control apparatus,
the drive control apparatus comprising:
a movable optical member;
a drive control apparatus, the drive control apparatus comprising:
a motor;
a transmission device including a gear and configured to transmit a driving force of the motor to the movable optical member;
a first detector provided on a side of the movable optical member with respect to the transmission device and configured to detect a driving state of the movable optical member;

a second detector provided on a side of the motor with respect to the transmission device and configured to detect a driving state of the movable optical member; and a controller configured to control the motor, wherein the controller is configured to control the motor based on a first detection result obtained by the first detector in a case where a difference between the first detection result and a second detection result obtained by the second detector does not exceed a given value, and control the motor based on the second detection result in a case where the difference exceeds the given value.

12. The image pickup system according to claim 11, wherein the image pick up system is configured to correct, based on the first detection result, an optical aberration that is contained in the image formed by the lens apparatus.

* * * * *